(12) United States Patent
Akita

(10) Patent No.: US 10,647,374 B1
(45) Date of Patent: May 12, 2020

(54) STRADDLE TYPE VEHICLE AND REAR FENDER

(71) Applicant: KAWASAKI JUKOGYO KABUSHIKI KAISHA, Hyogo (JP)

(72) Inventor: Kohei Akita, Hyogo (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 16/223,408

(22) Filed: Dec. 18, 2018

(51) Int. Cl.
*B62J 15/02* (2006.01)

(52) U.S. Cl.
CPC .................................... *B62J 15/02* (2013.01)

(58) Field of Classification Search
CPC .................................................. B62J 15/00–02
See application file for complete search history.

(56) References Cited

U.S. PATENT DOCUMENTS

| | | | |
|---|---|---|---|
| 7,036,837 B1* | 5/2006 | Bauer | B62J 15/02 180/219 |
| 7,793,747 B2* | 9/2010 | Brown | B62J 9/001 180/219 |
| 8,985,416 B2* | 3/2015 | Schanz | B62J 9/001 224/413 |
| 2007/0046016 A1* | 3/2007 | Fujimoto | B62J 15/00 280/847 |
| 2012/0248734 A1* | 10/2012 | Matsushima | B62J 15/00 280/281.1 |
| 2013/0313861 A1* | 11/2013 | Koyama | B62J 15/00 296/198 |
| 2014/0063825 A1* | 3/2014 | Nakamura | B62D 25/16 362/473 |
| 2014/0167452 A1* | 6/2014 | Nakagawa | B62J 15/00 296/198 |
| 2014/0175836 A1* | 6/2014 | Nakagawa | B62J 15/00 296/193.09 |
| 2014/0262580 A1* | 9/2014 | Bagnariol | B60G 7/006 180/218 |
| 2016/0001841 A1* | 1/2016 | Imamura | B62J 15/00 280/152.1 |
| 2016/0144921 A1* | 5/2016 | Oshima | B62J 23/00 180/229 |
| 2016/0214671 A1* | 7/2016 | Taguma | B62J 6/04 |
| 2016/0288852 A1* | 10/2016 | Nishimoto | B62J 6/04 |
| 2017/0282818 A1* | 10/2017 | Usa | B60R 16/0239 |
| 2017/0282989 A1* | 10/2017 | Niijima | B62J 15/00 |
| 2017/0297300 A1* | 10/2017 | Oishi | B32B 3/28 |
| 2017/0320531 A1* | 11/2017 | Serotta | B62J 15/02 |
| 2019/0009851 A1* | 1/2019 | Ohara | B62J 15/00 |
| 2019/0202514 A1* | 7/2019 | Matsushima | B29C 70/68 |
| 2019/0202515 A1* | 7/2019 | Matsushima | B29C 70/06 |

FOREIGN PATENT DOCUMENTS

JP 2014-118099 6/2014

* cited by examiner

*Primary Examiner* — Erez Gurari

(74) *Attorney, Agent, or Firm* — Wenderoth, Lind & Ponack, L.L.P.

(57) ABSTRACT

A straddle type vehicle includes a body frame, and a rear fender attached to the body frame. The rear fender has a fitting portion fitted to a fitted portion of the body frame to be held by the body frame, and a fixing portion fixed to the body frame by a fixing member in a fitted state in which the fitting portion is fitted to the fitted portion.

13 Claims, 7 Drawing Sheets

STRADDLE TYPE VEHICLE AND REAR FENDER

BACKGROUND OF THE INVENTION

Field of the Invention

The present invention relates to a straddle type vehicle and a rear fender.

Description of Related Art

In a straddle type vehicle such as a motorcycle, a rear fender covering an upper part of a rear wheel is attached to the vehicle rear side of a body frame with a bolt. For example, as described in JP 2014-118099 A, a rear fender is attached to the vehicle rear side of a body frame with bolts, by fixing the vehicle front side of the rear fender to the vehicle rear side of the body frame with bolts, and fixing the center side in the vehicle longitudinal direction of the rear fender to the vehicle rear side of the body frame with bolts.

SUMMARY OF THE INVENTION

In a straddle type vehicle in which a rear fender is attached to a body frame, when the rear fender is attached to the body frame using a fixing member such as a bolt, an operator manually aligns the rear fender to a predetermined position of the body frame, and the operator maintains the aligned state to fix the rear fender to the body frame by using the fixing member.

However, when the operator fixes the rear fender to the body frame by the fixing member with the rear fender aligned with the body frame, attachment of the rear fender to the body frame may include difficulties such as detachment of the rear fender from the body frame.

Accordingly, it is an object of the present invention to provide a straddle type vehicle and a rear fender capable of improving workability of mounting a rear fender on a body frame.

In order to achieve the above objective, the present invention provides a straddle type vehicle including: a body frame; and a rear fender attached to the body frame, in which the rear fender has a fitting portion fitted to a fitted portion of the body frame to be held by the body frame, and a fixing portion fixed to the body frame by a fixing member in a fitted state in which the fitting portion is fitted to the fitted portion.

According to the present invention, by fitting the fitting portion of the rear fender to the fitted portion of the body frame, the rear fender can be held by the body frame. It is possible to fix the rear fender to the body frame by using the fixing member, in a state where the rear fender is held by the body frame. There is no need to hold the rear fender in a state aligned with the body frame when the operator fixes the rear fender to the body frame using the fixing member. The workability of mounting the rear fender on the body frame can be improved.

When the rear fender is detached from the body frame, too, the fixing by the fixing member can be released in a state where the rear fender is held by the body frame, and the workability of detaching the rear fender from the body frame can be improved.

The rear fender is supported to the body frame by the fixing portion, and is supported to the body frame by the fitting portion. Accordingly, at the time of landing of the straddle type vehicle after a jump, for example, an impact force input to the rear fender from the body frame can be dispersed, and damage to the rear fender can be suppressed.

In one aspect of the present invention, in the fitted state, the rear fender is restricted from moving vertically relative to the body frame.

According to this aspect, it is possible to suppress the rear fender from falling off the vehicle body frame due to its own weight in a state where the rear fender is held by the vehicle body frame. Hence, the workability of mounting the rear fender can be improved. When the rear fender is detached from the body frame, too, it is possible to prevent the rear fender from falling off the body frame due to its own weight. Hence, the workability of detaching the rear fender can be improved. When a vertical impact force is input to the rear fender from the body frame at the time of landing of the straddle type vehicle after a jump, for example, the impact force can be dispersed, and damage to the rear fender can be suppressed.

In one aspect of the present invention, one of the fitted portion and the fitting portion has a protrusion protruding in a vehicle longitudinal direction, the other of the fitted portion and the fitting portion has a recess recessed in the vehicle longitudinal direction, and in the fitted state, the rear fender is restricted from moving vertically relative to the body frame by fitting the protrusion and the recess to each other, and substantially sandwiching the protrusion by the recess in the vertical direction.

According to this aspect, since the protrusion and the recess are fitted to each other in the fitted state, and the protrusion is substantially sandwiched by the recess in the vertical direction, the rear fender can be kept from falling off the body frame due to its own weight. Hence, the workability of mounting the rear fender can be improved. The state of the protrusion being substantially sandwiched by the recess in the vertical direction includes not only a case where there is no gap in the vertical direction between the protrusion and the recess, but also a case where there is a slight gap in the vertical direction between the protrusion and the recess.

In one aspect of the present invention, the fitted portion has a protrusion protruding to the vehicle rear side, the protrusion having an inclined face inclined to one side in the vertical direction toward the vehicle rear side; and the fitting portion has a recess recessed toward the vehicle rear side, the recess having an inclined face inclined toward one side in the vertical direction toward the vehicle rear side and abutting on the inclined face of the protrusion.

According to this aspect, the inclined face of the recess forming the fitting portion of the rear fender is brought into contact with the inclined face of the protrusion forming the fitted portion of the body frame. Hence, when an impact force is input to the rear fender from the body frame, the impact force can be dispersed to the inclined face of the rear fender from the inclined face of the body frame, and damage to the rear fender can be suppressed.

In an aspect of the present invention, in the fitted state, a contact area between a lower face portion of the protrusion and the recess is larger than a contact area between an upper face portion of the protrusion and the recess in the rear fender.

According to this aspect, as compared to an upward impact force input to the rear fender from the body frame, a downward impact force input to the rear fender from the body frame at the time of landing of the straddle type vehicle after a jump, for example, can be dispersed effectively.

In one aspect of the present invention, the body frame is provided in a pair spaced apart in the vehicle width direction, and the rear fender has the fitting portions respectively fitted to fitted portions of the pair of body frames.

According to this aspect, the rear fender can be held stably by the body frame, and the workability of mounting the rear fender on the body frame can be improved. Since the rear fender is supported to the body frame by the fitting portions respectively fitted to the fitted portions of the pair of body frames, an impact force input from the vehicle body frame to the rear fender can be more effectively dispersed, and damage to the rear fender can be more effectively suppressed.

In one aspect of the present invention, in the fitted state, the rear fender is restricted from moving in the vehicle width direction relative to the pair of body frames.

According to this aspect, since the rear fender is restricted from moving in the vehicle width direction while being held by the body frame, the rear fender can be held stably, and the workability of mounting the rear fender can be improved. The rear fender can be stably held when the rear fender is detached from the vehicle body frame, too, and the workability of detaching the rear fender can be improved. When an impact force in the vehicle width direction is input to the rear fender from the body frame, the impact force can be dispersed to the rear fender, and damage to the rear fender can be suppressed.

In an aspect of the present invention, in the fitted state, the rear fender is substantially sandwiched by the pair of body frames in the vehicle width direction to be restricted from moving in the vehicle width direction relative to the pair of body frames.

According to this aspect, since the rear fender is restricted from moving in the vehicle width direction while being held by the body frame, the rear fender can be held stably, and the workability of mounting the rear fender can be improved.

In one aspect of the present invention, the fitting portion is provided on the vehicle rear side of the fixing portion.

According to this aspect, as compared to a case where the fitting portion is not provided on the vehicle rear side of the fixing portion, when an impact force is input and a bending moment acts on the rear fender from the body frame at the time of landing of the straddle type vehicle after a jump, for example, the bending moment can be reduced, and damage to the rear fender can be suppressed.

In one aspect of the present invention, the rear fender has a positioning portion positioned in the vehicle longitudinal direction relative to the body frame in the fitted state, and the fixing portion is provided so as to coincide with a fixed portion of the body frame in the vehicle longitudinal direction when the rear fender is positioned relative to the body frame by the positioning portion.

According to this aspect, the rear fender can be positioned in the vehicle longitudinal direction relative to the body frame in the fitted state by the positioning portion. Hence, it is possible to stably hold the rear fender on the body frame. When the rear fender is positioned relative to the body frame by the positioning portion, the fixing portion of the rear fender is aligned with the fixed portion of the body frame in the vehicle longitudinal direction. Hence, fixing by the fixing member can be facilitated. Accordingly, the workability of mounting the rear fender on the vehicle body frame can be further improved.

In one aspect of the present invention, the body frame extends linearly from the vehicle front side to the vehicle rear side.

This aspect allows the rear fender to linearly move from the vehicle rear side to the vehicle front side, so that the fitting portion of the rear fender can be fitted to the fitted portion of the vehicle body frame. Thus, the rear fender can be held by the body frame relatively easily.

In one aspect of the present invention, at least one of the fitted portion and the fitting portion is tapered from the vehicle front side toward the vehicle rear side.

According to this aspect, the rear fender can be guided when the fitting portion of the rear fender is fitted to the fitted portion of the body frame, and the rear fender can be easily held by the body frame.

In one aspect of the present invention, each of the fitted portion and the fitting portion has an upper face portion extending substantially horizontally in the vehicle longitudinal direction, and a lower face portion extending to the vehicle lower side from the vehicle rear side of the upper face portion and inclined to the vehicle front side toward the vehicle lower side.

According to this aspect, when the fitting portion of the rear fender is fitted to the fitted portion of the body frame, the rear fender can be guided and held in a predetermined position of the body frame by the upper face portions and the lower face portions that form the fitting portion of the rear fender and the fitted portion of the body frame.

In one aspect of the present invention, the straddle type vehicle includes: a seat disposed on the vehicle front side of the rear fender; and a side cover disposed on the outer side in the vehicle width direction of the rear fender and the body frame. In the fixing portion, the rear fender is fixed to the body frame, together with the seat and the side cover, by the fixing member.

According to this aspect, the rear fender is fixed to the vehicle body frame by the fixing member, together with the seat and the side cover. Therefore, as compared to a case where the seat and the side cover are fixed to the body frame and the rear fender individually by fixing members, the number of parts and installation man-hours can be reduced.

In one aspect of the present invention, the straddle type vehicle includes a side cover disposed on the outer side in the vehicle width direction of the rear fender and the body frame. The rear fender has an insertion recess recessed from the outer side in the vehicle width direction toward the inner side in the vehicle width direction, and into which the side cover is inserted to position the side cover relative to the rear fender.

According to this aspect, since the rear fender has the insertion recess in which the side cover is positioned relative to the rear fender, the side cover can be positioned relative to the rear fender by inserting the side cover into the insertion recess of the rear fender. Hence, it is possible to relatively easily position and mount the side cover.

In one aspect of the present invention, the straddle type vehicle is a straddle type vehicle for running on rough terrain.

According to this aspect, in the straddle type vehicle for running on rough terrain, the workability of mounting the rear fender on the body frame can be improved, and the workability of detaching the rear fender from the body frame can be improved. Hence, work of replacing the rear fender can be easily performed.

The present invention also provides a straddle type vehicle including: a body frame; and a rear fender attached to the body frame, in which the rear fender has an abutting portion brought into contact with a face portion on at least one side in the vertical direction of the body frame to be held by the body frame, and a fixing portion fixed to the body frame by a fixing member in an abutting state in which the abutting portion is brought into contact with the face portion on at least one side in the vertical direction of the body frame.

According to the present invention, by bringing the abutting portion of the rear fender into contact with the face portion on one side in the vertical direction of the body frame, the rear fender can be held by the body frame. It is possible to fix the rear fender to the body frame by using the fixing member, in a state where the rear fender is held by the body frame. There is no need for the operator to hold the rear fender in a state aligned with the body frame, so that the workability of mounting the rear fender on the body frame can be improved.

When the rear fender is detached from the body frame, too, the fixing by the fixing member can be released in a state where the rear fender is held by the body frame, and the workability of detaching the rear fender from the body frame can be improved.

The rear fender is supported to the body frame by the fixing portion, and is supported to the body frame by the fitting portion. Accordingly, at the time of landing of the straddle type vehicle after a jump, for example, an impact force input to the rear fender from the body frame can be dispersed, and damage to the rear fender can be suppressed.

The present invention also provides a rear fender including: a fitting portion fitted to a fitted portion of a body frame to be held by the body frame; and a fixing portion fixed to the body frame by a fixing member in a fitted state in which the fitting portion is fitted to the fitted portion.

According to the present invention, by fitting the fitting portion of the rear fender to the fitted portion of the body frame, the rear fender can be held by the body frame. It is possible to fix the rear fender to the body frame by using the fixing member, in a state where the rear fender is held by the body frame. There is no need to hold the rear fender in a state aligned with the body frame when the operator fixes the rear fender to the body frame using the fixing member. The workability of mounting the rear fender on the body frame can be improved.

When the rear fender is detached from the body frame, too, the fixing by the fixing member can be released in a state where the rear fender is held by the body frame, and the workability of detaching the rear fender from the body frame can be improved.

The rear fender is supported to the body frame by the fixing portion, and is supported to the body frame by the fitting portion. Accordingly, at the time of landing of the straddle type vehicle in which the rear fender is attached on the body frame after a jump, for example, an impact force input to the rear fender from the body frame can be dispersed, and damage to the rear fender can be suppressed.

DETAILED DESCRIPTION OF THE PREFERRED EMBODIMENT

An embodiment of the present invention will be described below with reference to the accompanying drawings.

Figure 1:
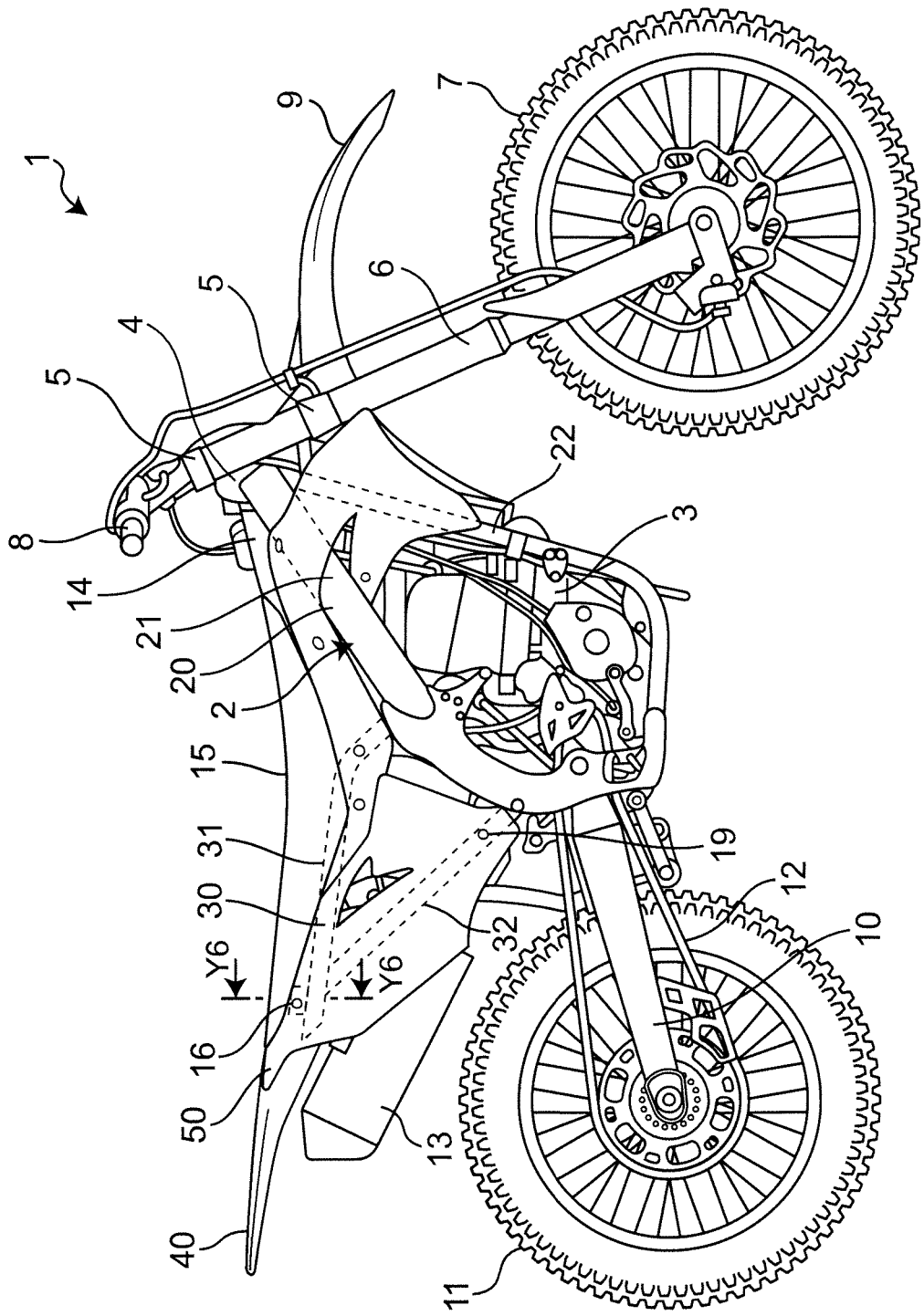
FIG. 1 is a side view of a motorcycle as an example of a straddle type vehicle according to an embodiment of the present invention.

FIG. 1 is a side view of a motorcycle as an example of a straddle type vehicle according to an embodiment of the present invention. In the specification, "front", "rear", "left", and "right" are the front direction, the rear direction, the left direction, and the right direction as seen from a rider who rides and operates the vehicle.

As shown in FIG. 1, a motorcycle 1 as an example of a straddle type vehicle according to an embodiment of the present invention is a rough terrain-running motorcycle suitable for running on rough terrain such as mountain roads. The motorcycle 1 is provided with a body frame 2 forming a skeleton of the vehicle body. The body frame 2 has a main frame 20 forming the front side of the body frame 2, and a rear frame 30 coupled to the rear side of the main frame 20 to form the rear side of the body frame 2.

The main frame 20 has an upper main frame portion 21 extending obliquely downward toward the rear above an engine 3, and a lower main frame portion 22 extending downward in front of the engine 3, extending rearward below the engine 3, and coupled to the rear side of the upper main frame portion 21.

The rear frame 30 includes an upper rear frame portion 31 which is a frame member extending substantially horizontally rearward from the longitudinal center of the upper main frame portion 21, and a lower rear frame portion 32 which is a frame member extending obliquely upward toward the rear from the rear side of the upper main frame portion 21, and coupled to the rear side of the upper rear frame portion 31.

The rear frame 30 is formed substantially symmetrical in the vehicle width direction. Each of the upper rear frame portion 31 and the lower rear frame portion 32 is provided in a right and left pair spaced apart in the vehicle width direction. The pair of lower rear frame portions 32 are respectively coupled to the upper rear frame portions 31.

A head pipe 4 is attached to the front side of the main frame 20. The upper sides of a pair of front forks 6 are supported to the head pipe 4 through a steering shaft and upper and lower brackets 5. A front wheel 7 is rotatably supported to the lower sides of the pair of front forks 6. A handle 8 is attached to the upper bracket 5, and a front fender 9 disposed above the front wheel 7 is attached to the lower bracket 5.

A swing arm 10 is vertically swingably supported to the rear side of the upper main frame portion 21. A rear wheel 11 is rotatably supported to the rear side of the swing arm 10. The rear wheel 11 is driven by the engine 3 through a power transmission mechanism 12 such as a chain. A muffler 13 connected to the engine 3 through an exhaust pipe is disposed above the rear wheel 11 and attached to the rear frame 30.

A fuel tank 14 is attached to the upper main frame portion 21. A driver's seat 15 is disposed behind the fuel tank 14. The front side of the seat 15 is locked to the fuel tank 14 by a hook, and the rear side of the seat 15 is fixed to the rear side of the rear frame 30 by using a bolt 16 as a fixing member.

A rear fender 40 disposed above the rear wheel 11 behind the seat 15 is fixed to the rear frame 30 by using the bolt 16. A pair of side covers 50 disposed on both sides in the vehicle width direction in front of the rear fender 40 are fixed to the rear frame 30 by using the bolt 16. The rear fender 40, the seat 15, and the side cover 50 are all fixed to the rear side of the rear frame 30 using the bolt 16.

The body frame 2 is formed into a hollow closed cross section from a metal material such as an aluminum material, and each of the front fender 9, the rear fender 40, and the side cover 50 is formed into a substantial plate shape from a resin material.

Figure 2:
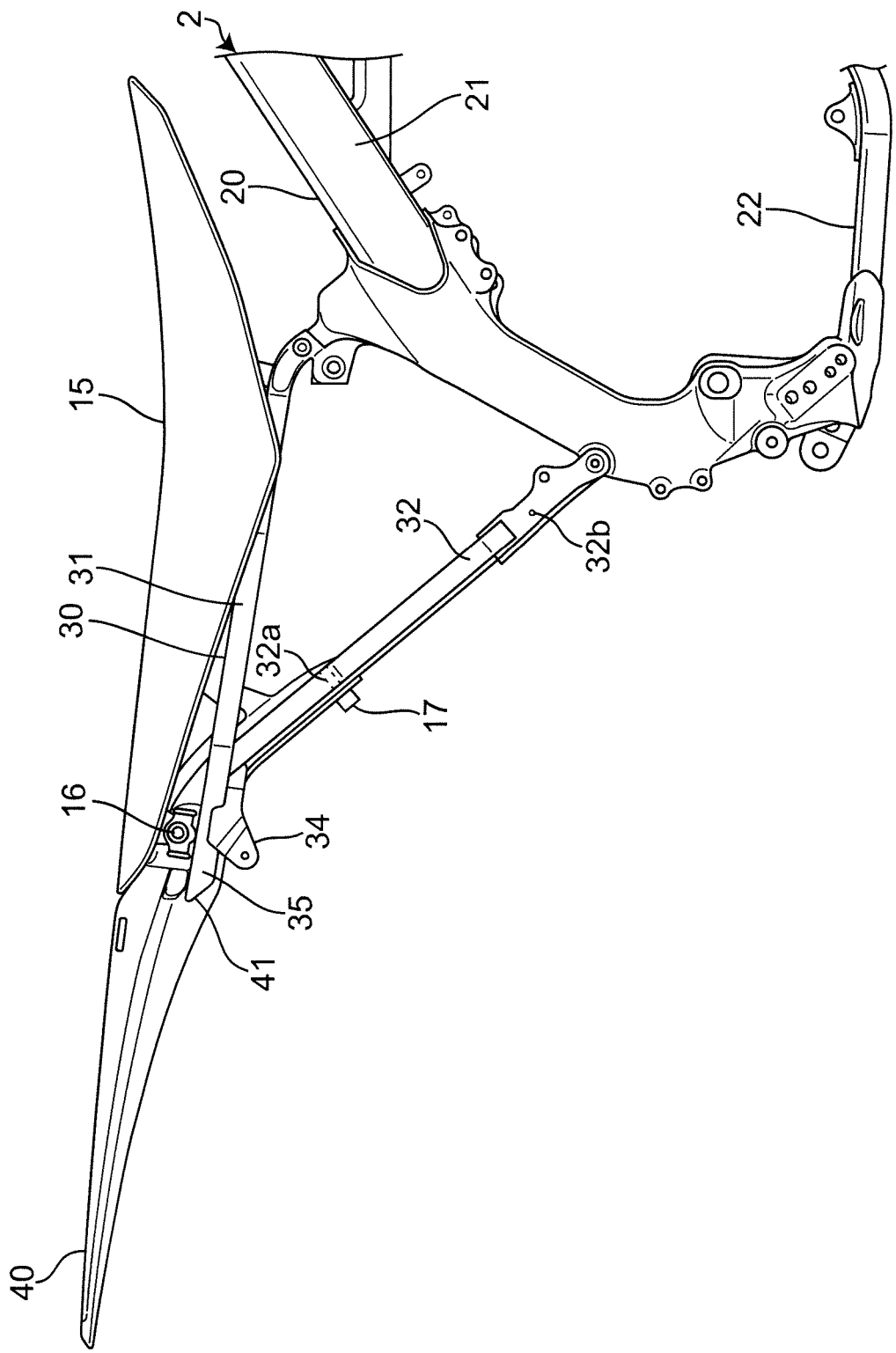
FIG. 2 is a side view of a rear fender and a seat attached to a body frame.
Figure 3:
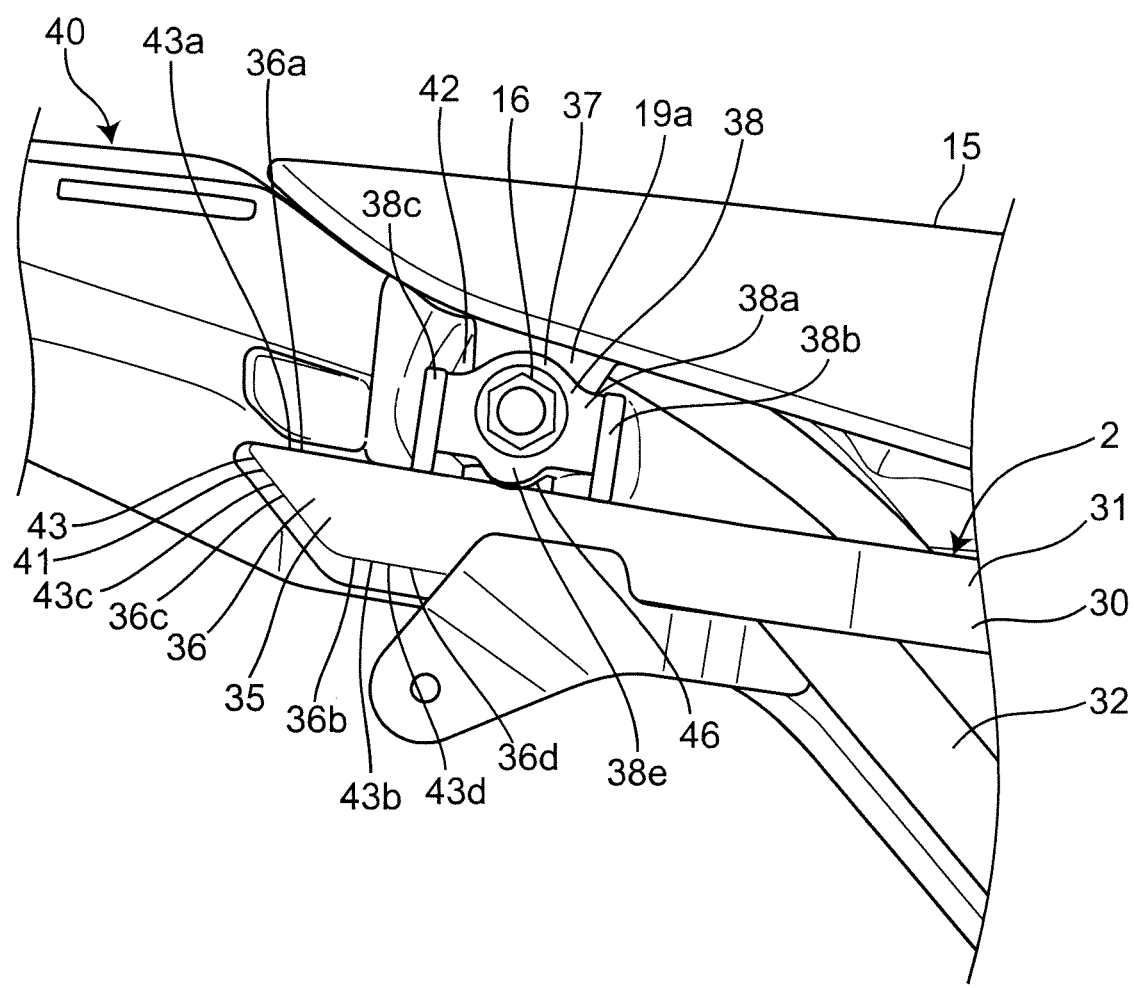
FIG. 3 is an enlarged view of a main part of the rear fender and the seat attached to the body frame shown in FIG. 2.
Figure 4:
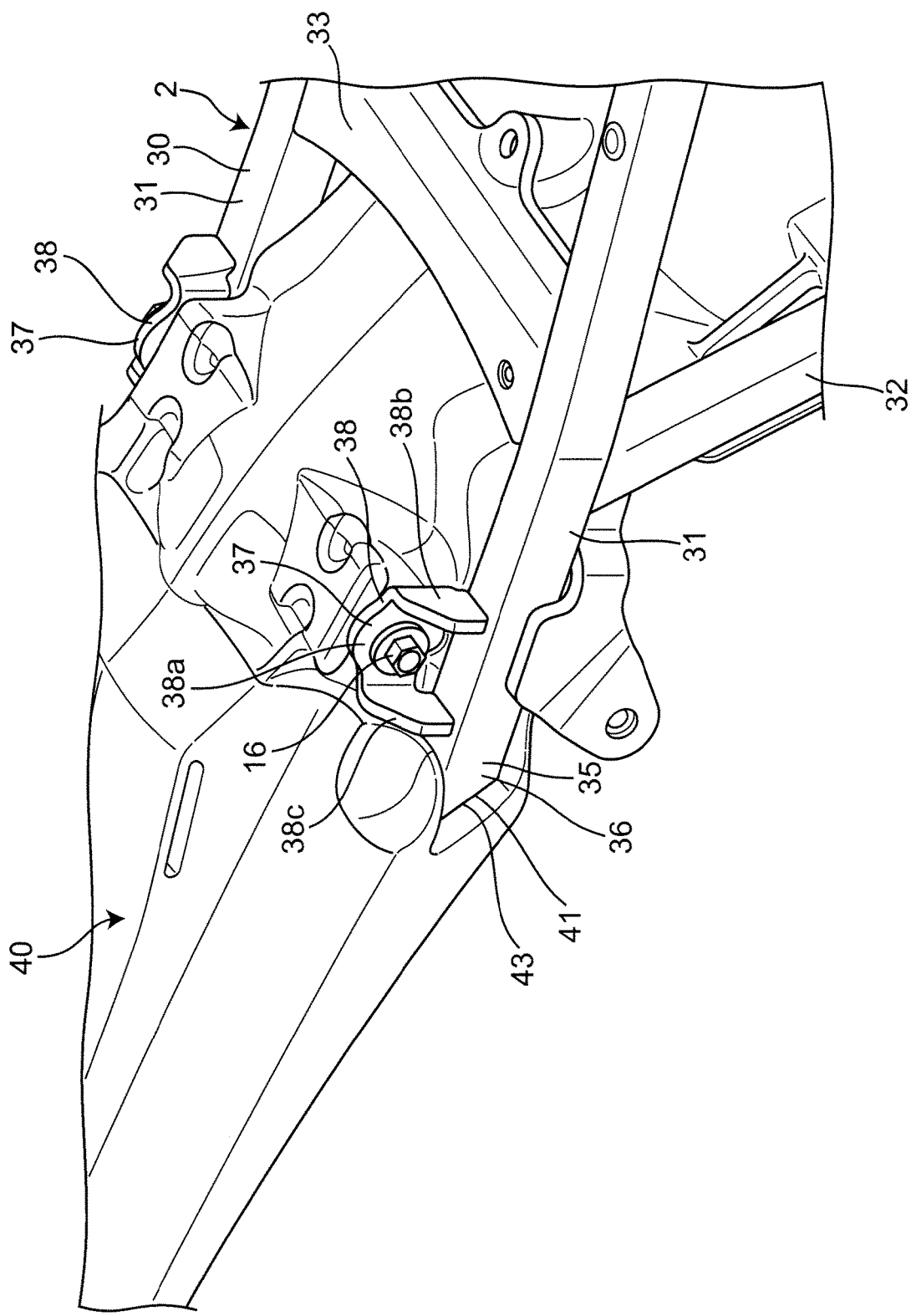
FIG. 4 is a perspective view of the rear fender attached to the body frame.
Figure 5:
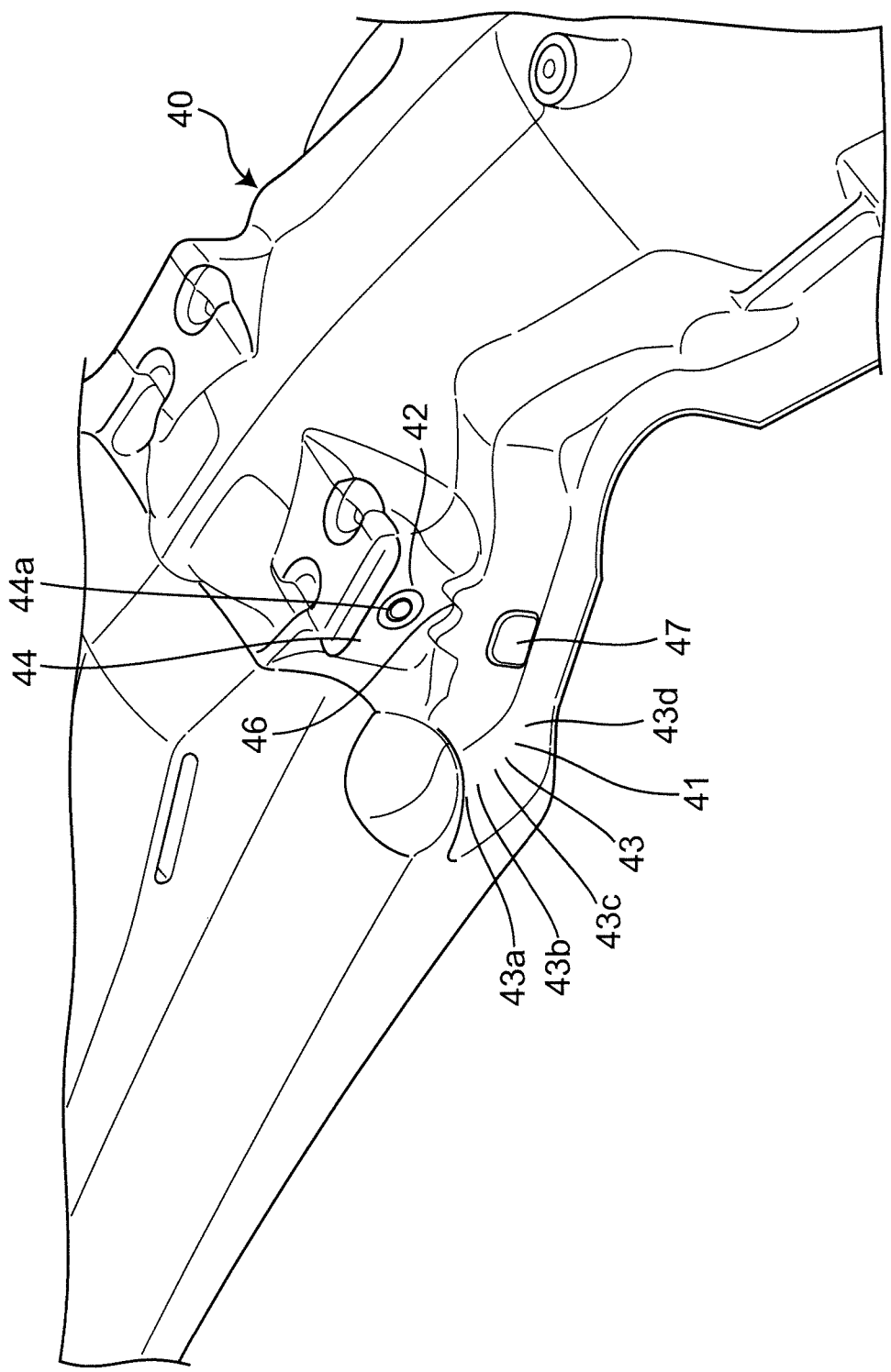
FIG. 5 is a perspective view of the rear fender.
Figure 6:
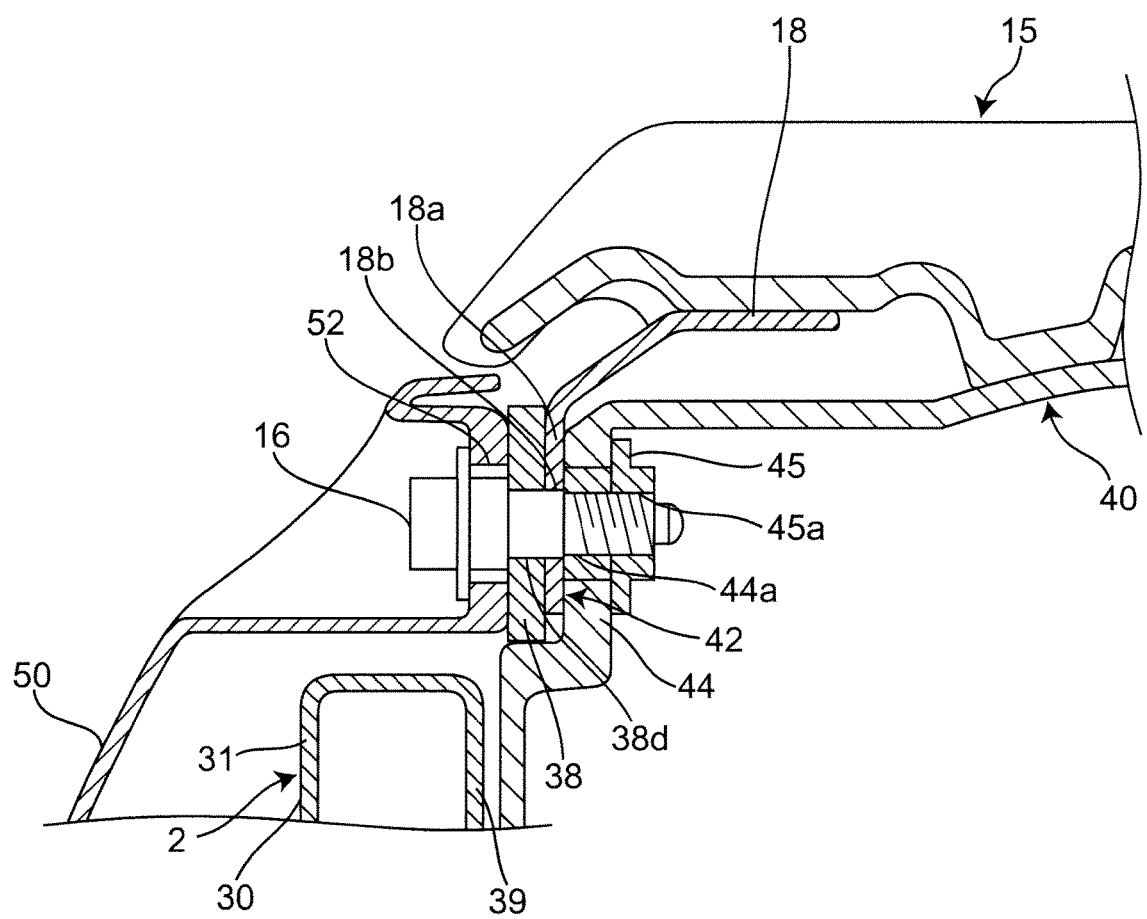
FIG. 6 is a cross-sectional view of a motorcycle taken along line Y6-Y6 in FIG. 1.

FIG. 2 is a side view of the rear fender and the seat attached to the body frame, FIG. 3 is an enlarged view of a main part of the rear fender and the seat attached to the body frame shown in FIG. 2, FIG. 4 is a perspective view of the rear fender attached to the body frame, FIG. 5 is a perspective view of the rear fender, and FIG. 6 is a cross-sectional view of the motorcycle taken along line Y6-Y6 in FIG. 1.

As shown in FIGS. 2 to 6, the upper rear frame portion 31 of the rear frame 30 extends substantially linearly in a substantially horizontal direction in the longitudinal direction. The lower rear frame portion 32 of the rear frame 30 extends obliquely linearly upward toward the rear. The pair of upper rear frame portions 31 and the pair of lower rear frame portions 32 are each provided substantially parallel to the vehicle width direction.

The rear frame 30 has a cross portion 33 extending in the vehicle width direction and connecting the pair of upper rear frame portions 31. A muffler mounting plate 34 is attached to the upper rear frame portion 31 on the right side in the vehicle width direction, and the muffler 13 is supported on the muffler mounting plate 34.

The rear fender 40 covers an upper part of the rear wheel 11 and is provided so as to cover the rear frame 30 from the rear side and the lower side. The rear fender 40 is formed so as to extend substantially horizontally after being inclined upward toward the rear in side view. The rear fender 40 is formed to be substantially symmetrical in the vehicle width direction, and the center in the vehicle width direction is curved so as to protrude upward as compared with both sides in the vehicle width direction.

As shown in FIG. 2, the rear fender 40 is attached to the rear frame 30 by, on each of both sides in the vehicle width direction, fixing the front side of the rear fender 40 to the lower rear frame portion 32 by using a bolt 17 as a fixing member, and fixing the longitudinal center of the rear fender 40 to the upper rear frame portion 31 by using the bolt 16 as a fixing member.

The front side of the rear fender 40 is attached to the lower rear frame portion 32 by placing the front side of the rear fender 40 on the rear side of the lower rear frame portion 32, and screwing the bolt 17 into a screw hole 32a of the lower rear frame portion 32 through a bolt insertion hole provided in the rear fender 40.

As shown in FIGS. 3 and 4, the rear fender 40 has a fitting portion 41 fitted to a fitted portion 35 provided on the rear side of the upper rear frame portion 31 and held by the upper rear frame portion 31, and a fixing portion 42 fixed to a fixed portion 37 provided in front of the fitted portion 35 of the upper rear frame portion 31 by the bolt 16 in a fitted state in which the fitting portion 41 is fitted to the fitted portion 35.

The fitted portion 35 of the upper rear frame portion 31 is configured of a protrusion 36 provided in a rear end part of the upper rear frame portion 31 and protruding rearward. The protrusion 36 of the upper rear frame portion 31 has an upper face portion 36a and a lower face portion 36b, and is tapered toward the rear. The upper face portion 36a of the protrusion 36 extends substantially horizontally. The lower face portion 36b of the protrusion 36 has an inclined face 36c inclined downward from the rear side to the front side of the upper face portion 36a, and a horizontal face 36d extending substantially horizontally frontward from the inclined face 36c.

The fitting portion 41 of the rear fender 40 is configured of a recess 43 provided in the longitudinal center of the rear fender 40 and recessed from front to rear. The recess 43 of the rear fender 40 has an upper face portion 43a and a lower face portion 43b, and is tapered toward the rear. The upper face portion 43a of the recess 43 extends substantially horizontally. The lower face portion 43b of the recess 43 has an inclined face 43c inclined downward from the rear side to the front side of the upper face portion 43a, and a horizontal face 43d extending substantially horizontally frontward from the inclined face 43c, and extends further to the front than the upper face portion 43a of the recess 43.

The recess 43 of the rear fender 40 is formed so as to follow the shape of the protrusion 36 of the upper rear frame portion 31. The rear fender 40 is moved frontward toward the body frame 2, and the fitting portion 41 of the rear fender 40 is fitted to the fitted portion 35 of the upper rear frame portion 31 from the rear.

In a fitted state in which the fitting portion 41 is fitted to the fitted portion 35, the rear fender 40 is restricted from moving vertically relative to the rear frame 30 by fitting the protrusion 36 of the upper rear frame portion 31 and the recess 43 of the rear fender 40 to each other, and substantially sandwiching the protrusion 36 by the recess 43 in the vertical direction. The state of the protrusion 36 being substantially sandwiched by the recess 43 in the vertical direction includes not only a case where there is no gap in the vertical direction between the protrusion 36 and the recess 43, but also a case where there is a slight gap in the vertical direction between the protrusion 36 and the recess 43.

In the fitted state, the upper face portion 43a of the recess 43 abuts and is in contact with the upper face portion 36a of the protrusion 36, the lower face portion 43b of the recess 43 abuts and is in contact with the lower face portion 36b of the protrusion 36, and the inclined face 43c of the recess 43 abuts and is in contact with the inclined face 36c of the protrusion 36. In the fitted state, a contact area between the lower face portion 36b of the protrusion 36 and the recess 43 is larger than a contact area between the upper face portion 36a of the protrusion 36 and the recess 43 in the rear fender 40.

As shown in FIGS. 5 and 6, the fixing portion 42 of the rear fender 40 is configured of a side face portion 44 provided in front of the fitting portion 41 and extending in a direction substantially perpendicular to the vehicle width direction. A mounting plate 45 having a bolt insertion hole 44a and a screw hole 45a on the inner side in the vehicle width direction of the side face portion 44 is attached to the side face portion 44 of the rear fender 40. The mounting plate 45 is attached to the inner side in the vehicle width direction of the side face portion 44 using an unillustrated locking member, but may be attached by other methods.

As shown in FIGS. 3 and 4, the fixed portion 37 of the upper rear frame portion 31 is configured of a mounting bracket 38 fixed to the upper rear frame portion 31 in a position closer to the front than a rear end part of the upper rear frame portion 31. The mounting bracket 38 has a side face portion 38a extending in a direction substantially perpendicular to the vehicle width direction, and a front face portion 38b and a rear face portion 38c extending outward in the vehicle width direction from the front side and the rear side of the side face portion 38a. As shown in FIG. 6, a bolt insertion hole 38d is formed in the side face portion 38a of the mounting bracket 38. The mounting bracket 38 is attached to the upper rear frame portion 31 by fixing each of the lower sides of the front face portion 38b and the rear face portion 38c to the upper rear frame portion 31.

The rear fender 40 is attached to the upper rear frame portion 31 by placing the side face portion 44 on the inner side in the vehicle width direction of the side face portion 38a of the mounting bracket 38 in the fitted state in which the fitting portion 41 is fitted to the fitted portion 35, and screwing the bolt 16 into the screw hole 45a of the mounting plate 45 through the bolt insertion hole 38d of the mounting bracket 38 and the bolt insertion hole 44a of the side face portion 44.

As shown in FIG. 3, the rear fender 40 has a positioning portion 46 positioned in the longitudinal direction relative to the upper rear frame portion 31 in the fitted state. The positioning portion 46 of the rear fender 40 is provided below the side face portion 44, and is recessed downward in a substantial arc shape in side view. A positioned portion 38e protruding downward in a substantial arc shape in side view so as to follow the shape of the positioning portion 46 of the rear fender 40, is provided in the side face portion 38a of the mounting bracket 38 provided on the upper rear frame portion 31.

The rear fender 40 is provided such that the fixing portion 42 coincides with the fixed portion 37 of the upper rear frame portion 31 in the longitudinal direction, that is, the bolt insertion hole 44a coincides with the bolt insertion hole 38d in the longitudinal direction, when the positioned portion 38e of the upper rear frame portion 31 engages with the positioning portion 46 of the rear fender 40 and is positioned relative to the upper rear frame portion 31 by the positioning portion 46 in the fitted state.

The rear fender 40 is configured such that when the rear fender 40 is moved longitudinally relative to the body frame 2, application of a load equal to or larger than a predetermined value on the front side engages the positioning portion 46 of the rear fender 40 and the positioned portion 38e of the upper rear frame portion 31, and application of a load equal to or larger than a predetermined value on the rear side releases the engagement between the positioning portion 46 of the rear fender 40 and the positioned portion 38e of the upper rear frame portion 31.

The rear fender 40 also has a restricting portion 47 provided in front of the fitting portion 41 to restrict movement in the vehicle width direction relative to the body frame 2 in the fitted state. The restricting portion 47 extends in a direction substantially perpendicular to the vehicle width direction, and abuts on a side face portion 39 on the inner side in the vehicle width direction of the upper rear frame portion 31 in the fitted state.

In the fitted state, the rear fender 40 is substantially sandwiched by the pair of upper rear frame portions 31 in the vehicle width direction to be restricted from moving in the vehicle width direction relative to the pair of upper rear frame portions 31, with the restricting portions 47 provided on both sides in the vehicle width direction respectively abutting on the side face portions 39 of the pair of upper rear frame portions 31.

In the motorcycle 1, as shown in FIG. 6, the rear fender 40 is fixed to the body frame 2 by the bolt 16, together with the seat 15 and the side cover 50, in the fixing portion 42. A seat bracket 18 is attached to the rear lower side of the seat 15. In the seat bracket 18, a bolt insertion hole 18b is formed in a vertical face portion 18a extending in a direction substantially perpendicular to the vehicle width direction.

The bolt insertion hole 18b of the seat bracket 18 is provided so as to coincide with the bolt insertion hole 44a of the rear fender 40, in a state where the front side of the seat 15 is locked to the fuel tank 14 by a hook. The seat 15 is attached to the body frame 2, by screwing the bolt 16 into the screw hole 45a of the mounting plate 45 through the bolt insertion hole 18b of the seat bracket 18.

Figure 7:
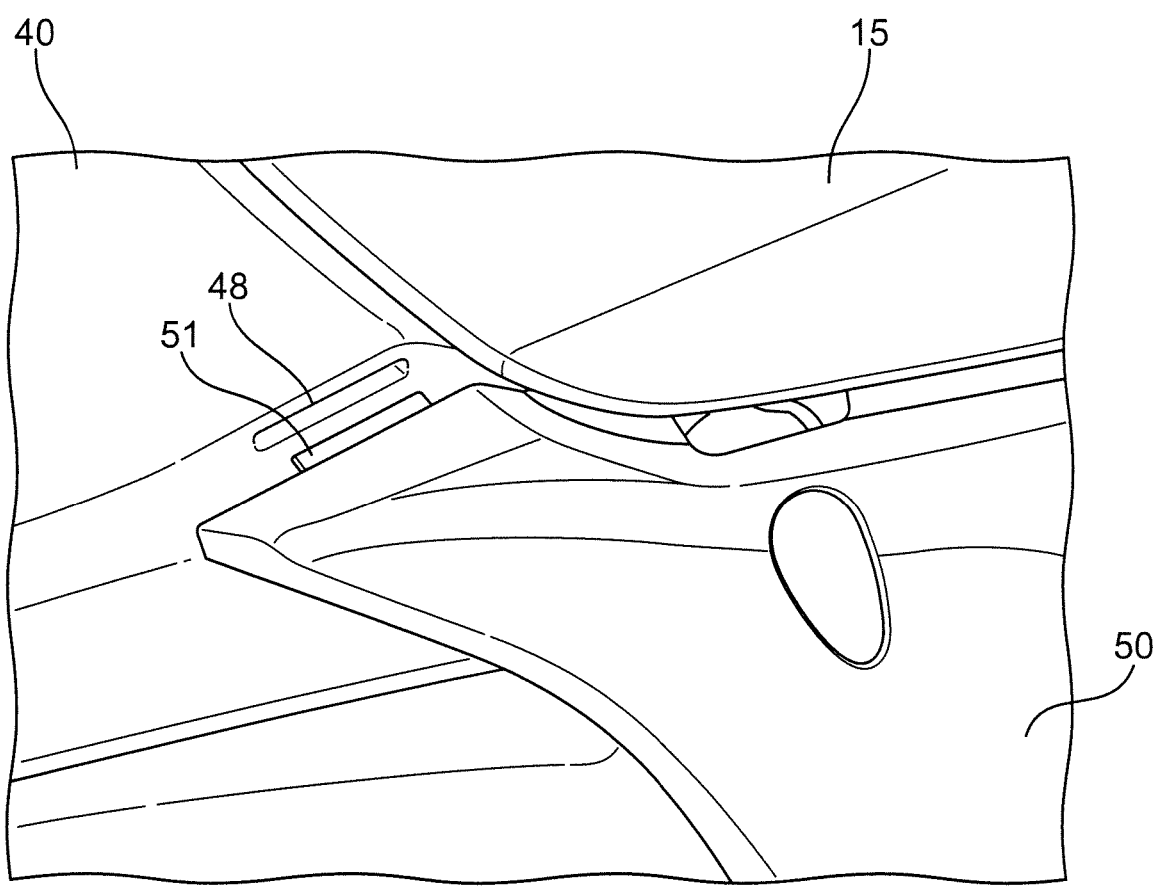
FIG. 7 is an explanatory view for explaining an insertion recess of the rear fender and an insertion protrusion of the side cover.

FIG. 7 is an explanatory view for explaining an insertion recess of the rear fender and an insertion protrusion of the side cover. As shown in FIG. 7, the side cover 50 has an insertion protrusion 51 protruding in a substantially rectangular shape inward in the vehicle width direction on the rear side. The rear fender 40 has an insertion recess 48 recessed in a substantially rectangular shape from the outer side in the vehicle width direction toward the inner side in the vehicle width direction, and formed so as to follow the shape of the insertion protrusion 51 of the side cover 50.

The side cover 50 is positioned in a predetermined position relative to the rear fender 40, by inserting the insertion protrusion 51 into the insertion recess 48 of the rear fender 40. The side cover 50 also has a bolt insertion hole 52 on the rear side and a bolt insertion hole on the front side.

Of the side cover 50, the bolt insertion hole 52 provided on the rear side and the bolt insertion hole provided on the front side are respectively provided so as to coincide with the bolt insertion hole 44a provided in the side face portion 44 of the rear fender 40 and a screw hole 32b provided in the lower rear frame portion 32, when the insertion protrusion 51 of the side cover 50 is inserted into the insertion recess 48 of the rear fender 40.

The side cover 50 is attached to the body frame 2, by screwing the bolt 16 into the screw hole 45a of the mounting plate 45 through the bolt insertion hole 52 provided on the rear side of the side cover 50, and also screwing a bolt 19 as a fixing member into the screw hole 32b of the lower rear frame portion 32 through the bolt insertion hole provided on the front side of the side cover 50.

In the motorcycle 1 configured as described above, when the rear fender 40 is attached to the body frame 2, the rear fender 40 is moved from the rear side to the front side relative to the body frame 2, and the fitting portion 41 is fitted to the fitted portion 35 of the body frame 2 to be held by the body frame 2. In the fitted state in which the fitting portion 41 is fitted to the fitted portion 35, the rear fender 40 is held on the body frame 2 without being held by the operator.

In the fitted state, the fixing portion 42 of the rear fender 40 is fixed to the fixed portion 37 of the body frame 2 by the bolt 16, and the front side of the rear fender 40 is fixed to the lower rear frame portion 32 of the body frame 2 by the bolt 17, whereby the rear fender 40 is attached to the body frame 2.

The seat 15 and the side cover 50 are disposed on the body frame 2 before the fixing portion 42 of the rear fender 40 is fixed to the fixed portion 37 of the body frame 2 by the bolt 16. The rear fender 40 is fixed to the body frame 2, together with the seat 15 and the side cover 50, by the bolt 16. The front side of the side cover 50 is fixed to the body frame 2 with the bolt 19, before or after the fixing portion 42 of the rear fender 40 is fixed to the fixed portion 37 of the body frame 2 with the bolt 16.

In the embodiment, the front side of the rear fender 40 is fixed to the body frame 2 using the bolt 17, and the longitudinal center of the rear fender 40 is fixed to the body frame 2 using the bolt 16. However, the rear fender 40 may be fixed to the body frame 2 by using only the bolt 16.

In the embodiment, the inclined face 43c is provided in the lower face portion 43b of the recess 43 forming the fitting portion 41, and the inclined face 36c is provided in the lower face portion 36b of the protrusion 36 forming the fitted portion 35. Instead, an inclined face inclined upward toward the front may be provided in the upper face portion 43a of the recess 43, and an inclined face inclined upward toward the front and abutting on the inclined face of the recess 43 may be provided in the upper face portion 36a of the protrusion 36.

In the embodiment, each of the fitting portion 41 of the rear fender 40 and the fitted portion 35 of the body frame 2 is tapered from the front toward the rear. Instead, an embodiment may be configured such that at least one of the fitting portion 41 of the rear fender 40 and the fitted portion 35 of the body frame 2 is tapered from the front toward the rear.

In the embodiment, the fitting portion 41 of the rear fender 40 is formed of the recess 43 recessed from front to rear, and the fitted portion 35 of the body frame 2 is formed of the protrusion 36 protruding from front to rear. Instead, the fitting portion 41 of the rear fender 40 may be formed of a protrusion protruding from rear to front, the fitted portion 35 of the body frame 2 may be formed of a recess recessed from rear to front, and the protrusion may be substantially sandwiched by the recess in the vertical direction to be restricted from moving vertically relative to the body frame 2.

As described above, the straddle type vehicle 1 according to the embodiment includes the body frame 2 and the rear fender 40 attached to the body frame 2. The rear fender 40 has the fitting portion 41 fitted to the fitted portion 35 of the body frame 2 to be held by the body frame 2, and the fixing portion 42 fixed to the body frame 2 by the fixing member 16 in a fitted state in which the fitting portion 41 is fitted to the fitted portion 35.

Hence, by fitting the fitting portion 41 of the rear fender 40 to the fitted portion 35 of the body frame 2, the rear fender 40 can be held by the body frame 2. It is possible to fix the rear fender 40 to the body frame 2 by using the fixing member 16, in a state where the rear fender 40 is held by the body frame 2. There is no need to hold the rear fender 40 in a state aligned with the body frame 2 when the operator fixes the rear fender 40 to the body frame 2 using the fixing member 16. The workability of mounting the rear fender 40 on the body frame 2 can be improved.

When the rear fender 40 is detached from the body frame 2, too, the fixing by the fixing member 16 can be released in a state where the rear fender 40 is held by the body frame 2, and the workability of detaching the rear fender 40 from the body frame 2 can be improved.

The rear fender 40 is supported to the body frame 2 by the fixing portion 42, and is supported to the body frame 2 by the fitting portion 41. Accordingly, at the time of landing of the straddle type vehicle 1 after a jump, for example, an impact force input to the rear fender 40 from the body frame 2 can be dispersed, and damage to the rear fender 40 can be suppressed.

In the fitted state, the rear fender 40 is restricted from moving vertically relative to the body frame 2. This makes it possible to prevent the rear fender 40 from falling off the body frame 2 due to its own weight in a state where the rear fender 40 is held by the body frame 2. Hence, the workability of mounting the rear fender 40 can be improved. When the rear fender 40 is detached from the body frame 2, too, it is possible to prevent the rear fender 40 from falling off the body frame 2 due to its own weight. Hence, the workability of detaching the rear fender 40 can be improved. When a vertical impact force is input to the rear fender 40 from the body frame 2 at the time of landing of the straddle type vehicle 1 after a jump, for example, the impact force can be dispersed, and damage to the rear fender 40 can be suppressed.

One of the fitted portion 35 and the fitting portion 41 has the protrusion 36 protruding in the vehicle longitudinal direction, and the other of the fitted portion 35 and the fitting portion 41 has the recess 43. In the fitted state, the rear fender 40 is restricted from moving vertically relative to the body frame 2 by fitting the protrusion 36 and the recess 43 to each other, and substantially sandwiching the protrusion 36 by the recess 43 in the vertical direction. As a result, since the protrusion 36 and the recess 43 are fitted to each other in the fitted state, and the protrusion 36 is substantially sandwiched by the recess 43 in the vertical direction, the rear fender 40 can be kept from falling off the body frame 2 due to its own weight. Hence, the workability of mounting the rear fender 40 can be improved.

The fitted portion 35 has the protrusion 36 protruding to the vehicle rear side, the protrusion 36 has the inclined face 36c inclined to one side in the vertical direction toward the vehicle rear side, the fitting portion 41 has the recess 43 recessed toward the vehicle rear side, and the recess 43 has the inclined face 43c inclined toward one side in the vertical direction toward the vehicle rear side and abutting on the inclined face 36c of the protrusion 36. As a result, the inclined face 43c of the recess 43 forming the fitting portion 41 of the rear fender 40 is brought into contact with the inclined face 36c of the protrusion 36 forming the fitted portion 35 of the body frame 2. Hence, when an impact force is input to the rear fender 40 from the body frame 2, the impact force can be dispersed to the inclined face 43c of the rear fender 40 from the inclined face 36c of the body frame 2, and damage to the rear fender 40 can be suppressed.

In the fitted state, a contact area between the lower face portion 36b of the protrusion 36 and the recess 43 is larger than a contact area between the upper face portion 36a of the protrusion 36 and the recess 43 in the rear fender 40. Hence, as compared to an upward impact force input to the rear fender 40 from the body frame 2, a downward impact force input to the rear fender 40 from the body frame 2 at the time of landing of the straddle type vehicle 1 after a jump, for example, can be dispersed effectively.

The body frame 2 is provided in a pair spaced apart in the vehicle width direction, and the rear fender 40 has the fitting portions 41 respectively fitted to the fitted portions 35 of the pair of body frames 2. As a result, the rear fender 40 can be held stably by the body frame 2, and the workability of mounting the rear fender 40 on the body frame 2 can be improved. Since the rear fender 40 is supported to the body frame 2 by the fitting portions 41 respectively fitted to the fitted portions 35 of the pair of body frames 2, an impact force input from the vehicle body frame 2 to the rear fender 40 can be more effectively dispersed, and damage to the rear fender 40 can be more effectively suppressed.

In the fitted state, the rear fender 40 is restricted from moving in the vehicle width direction relative to the pair of body frames 2. Hence, since the rear fender 40 is restricted from moving in the vehicle width direction while being held by the body frame 2, the rear fender 40 can be held stably, and the workability of mounting the rear fender 40 can be improved. The rear fender 40 can be stably held when the rear fender 40 is detached from the vehicle body frame 2, too, and the workability of detaching the rear fender 40 can be improved. When an impact force in the vehicle width direction is input to the rear fender 40 from the body frame 2, the impact force can be dispersed to the rear fender 40, and damage to the rear fender 40 can be suppressed.

In the fitted state, the rear fender 40 is substantially sandwiched by the pair of body frames 2 in the vehicle width direction to be restricted from moving in the vehicle width direction relative to the pair of body frames 2. Hence, since the rear fender 40 is restricted from moving in the vehicle width direction while being held by the body frame 2, the rear fender 40 can be held stably, and the workability of mounting the rear fender 40 can be improved.

The fitting portion 41 is provided on the vehicle rear side of the fixing portion 42. Hence, as compared to a case where the fitting portion 41 is not provided on the vehicle rear side of the fixing portion 42, when an impact force is input and a bending moment acts on the rear fender 40 from the body frame 2 at the time of landing of the straddle type vehicle 1 after a jump, for example, the bending moment can be reduced, and damage to the rear fender 40 can be suppressed.

The rear fender 40 has the positioning portion 46 positioned in the vehicle longitudinal direction relative to the body frame 2 in the fitted state, and the fixing portion 42 is provided so as to coincide with the fixed portion 37 of the body frame 2 in the vehicle longitudinal direction when the rear fender 40 is positioned relative to the body frame 2 by the positioning portion 46. As a result, the rear fender 40 can be positioned in the vehicle longitudinal direction relative to the body frame 2 in the fitted state by the positioning portion 46. Hence, it is possible to stably hold the rear fender 40 on the body frame 2. When the rear fender 40 is positioned relative to the body frame 2 by the positioning portion 46, the fixing portion 42 of the rear fender 40 is aligned with the fixed portion 37 of the body frame 2 in the vehicle longitudinal direction. Hence, fixing by the fixing member 16 can be facilitated. Accordingly, the workability of mounting the rear fender 40 on the vehicle body frame 2 can be further improved.

The body frame 2 extends linearly from the vehicle front side to the vehicle rear side. This allows the rear fender 40 to linearly move from the vehicle rear side to the vehicle front side, so that the fitting portion 41 of the rear fender 40 can be fitted to the fitted portion 35 of the vehicle body frame 2. Thus, the rear fender 40 can be held by the body frame 2 relatively easily.

At least one of the fitted portion 35 and the fitting portion 41 is tapered from the vehicle front side toward the vehicle rear side. Hence, the rear fender 40 can be guided when the fitting portion 41 of the rear fender 40 is fitted to the fitted portion 35 of the body frame 2, and the rear fender 40 can be easily held by the body frame 2.

Each of the fitted portion 35 and the fitting portion 41 has an upper face portion 36a, 43a extending substantially horizontally in the vehicle longitudinal direction, and a lower face portion 36b, 43b extending to the vehicle lower side from the vehicle rear side of the upper face portion 36a, 43a and inclined to the vehicle front side toward the vehicle lower side. Hence, when the fitting portion 41 of the rear fender 40 is fitted to the fitted portion 35 of the body frame 2, the rear fender 40 can be guided and held in a predetermined position of the body frame 2 by the upper face portions 43a, 36a and the lower face portions 43b, 36b that form the fitting portion 41 of the rear fender 40 and the fitted portion 35 of the body frame 2.

The rear fender 40 includes the seat 15 disposed on the vehicle front side of the rear fender 40, and the side cover 50 disposed on the outer side in the vehicle width direction of the rear fender 40 and the body frame 2. In the fixing portion 42, the rear fender 40 is fixed to the body frame 2, together with the seat 15 and the side cover 50, by the fixing member 16. As a result, the rear fender 40 is fixed to the vehicle body frame 2 by the fixing member 16, together with the seat 15 and the side cover 50. Therefore, as compared to a case where the seat 15 and the side cover 50 are fixed to the body frame 2 and the rear fender 40 individually by fixing members, the number of parts and installation man-hours can be reduced.

The rear fender 40 is provided with the side cover 50 disposed on the outer side in the vehicle width direction of the rear fender 40 and the body frame 2. The rear fender 40 has the insertion recess 48 recessed from the outer side in the vehicle width direction toward the inner side in the vehicle width direction, and into which the side cover 50 is inserted to position the side cover 50 relative to the rear fender 40. Accordingly, since the rear fender 40 has the insertion recess 48 in which the side cover 50 is positioned relative to the rear fender 40, the side cover 50 can be positioned relative to the rear fender 40 by inserting the side cover 50 into the insertion recess 48 of the rear fender 40. Hence, it is possible to relatively easily position and mount the side cover 50.

The straddle type vehicle 1 is a straddle type vehicle for running on rough terrain. Accordingly, in the straddle type vehicle 1 for running on rough terrain, the workability of mounting the rear fender 40 on the body frame 2 can be improved, and the workability of detaching the rear fender 40 from the body frame 2 can be improved. Hence, work of replacing the rear fender 40 can be easily performed.

The rear fender 40 according to the embodiment includes the fitting portion 41 fitted to the fitted portion 35 of the body frame 2 to be held by the body frame 2, and the fixing portion 42 fixed to the body frame 2 by the fixing member 16 in a fitted state in which the fitting portion 41 is fitted to the fitted portion 35.

Hence, by fitting the fitting portion 41 of the rear fender 40 to the fitted portion 35 of the body frame 2, the rear fender 40 can be held by the body frame 2. It is possible to fix the rear fender 40 to the body frame 2 by using the fixing member 16, in a state where the rear fender 40 is held by the body frame 2. There is no need to hold the rear fender 40 in a state aligned with the body frame 2 when the operator fixes the rear fender 40 to the body frame 2 using the fixing member 16. The workability of mounting the rear fender 40 on the body frame 2 can be improved.

When the rear fender 40 is detached from the vehicle body frame 2, too, fixing by the fixing member 16 can be released in a state where the rear fender 40 is held by the body frame 2. There is no need to hold the rear fender 40 when the operator releases the fixing by the fixing member 16, and the workability of detaching the rear fender 40 from the vehicle body frame 2 can be improved.

The rear fender 40 is supported to the body frame 2 by the fixing portion 42, and is supported to the body frame 2 by the fitting portion 41. Accordingly, at the time of landing of the straddle type vehicle 1 in which the rear fender 40 is attached on the body frame 2 after a jump, for example, an impact force input to the rear fender 40 from the body frame 2 can be dispersed, and damage to the rear fender 40 can be suppressed.

In the embodiment described above, the rear fender 40 is held to the body frame 2 by fitting the fitting portion 41 of the rear fender 40 to the fitted portion 35 of the body frame 2, and is fixed to the body frame 2 in the fixing portion 42 by the fixing member 16 in the fitted state in which the fitting portion 41 is fitted to the fitted portion 35.

In the fitted state, the upper face portion 43a and the lower face portion 43b of the recess 43 forming the fitting portion 41 of the rear fender 40 respectively abut on the upper face portion 36a and the lower face portion 36b of the protrusion 36 forming the fitted portion 35 of the body frame 2. However, an embodiment may be configured such that at least one face portion of the upper face portion 43a and the lower face portion 43b of the recess 43 abuts and is in contact with at least one face portion of the upper face portion 36a and the lower face portion 36b of the protrusion 36.

In this case, the rear fender 40 has an abutting portion 43a, 43b brought into contact with the face portion 36a, 36b on at least one side in the vertical direction of the body frame 2 to be held by the body frame 2, and a fixing portion 42 fixed to the body frame 2 by the fixing member 16 in an abutting state in which the abutting portion 43a, 43b is brought into contact with the face portion 36a, 36b on at least one side in the vertical direction of the body frame 2.

In this case, by bringing the abutting portion 43a, 43b of the rear fender 40 into contact with the face portion 36a, 36b on one side in the vertical direction of the body frame 2, the rear fender 40 can be held by the body frame 2. It is possible to fix the rear fender 40 to the body frame 2 by using the fixing member 16, in a state where the rear fender 40 is held by the body frame 2. There is no need for the operator to hold the rear fender 40 in a state aligned with the body frame 2, so that the workability of mounting the rear fender 40 on the body frame 2 can be improved.

When the rear fender 40 is detached from the vehicle body frame 2, too, fixing by the fixing member 16 can be released in a state where the rear fender 40 is held by the body frame 2. There is no need to hold the rear fender 40 when the operator releases the fixing by the fixing member 16, and the workability of detaching the rear fender 40 from the vehicle body frame 2 can be improved.

Since the rear fender 40 is supported to the body frame 2 by the fixing portion 42 and supported to the body frame 2 by the abutting portion 43a, 43b, at the time of landing of the straddle type vehicle 1 after a jump, for example, an impact force input to the rear fender 40 from the body frame 2 can be dispersed, and damage to the rear fender 40 can be suppressed.

In the embodiment, the rear fender 40 has the positioning portion 46 positioned in the vehicle longitudinal direction relative to the body frame 2 in a fitted state in which the fitting portion 41 is fitted to the fitted portion 35. However, it is also possible to omit the positioning section 46.

In the embodiment, the rear fender 40 is moved in the vehicle longitudinal direction relative to the body frame 2, and the fitted portion 35 of the body frame 2 and the fitting portion 41 of the rear fender 40 are fitted to each other. However, the rear fender may be moved in the vehicle width direction so that the fitted portion of the body frame and the fitting portion of the rear fender are fitted to each other.

Although the body frame 2 is formed linearly in the vicinity of the fitting portion 41 of the rear fender 40, the body frame 2 may be curved with a predetermined curvature in the vicinity of the fitting portion 41 of the rear fender 40. Although the straddle type vehicle 1 is a straddle type vehicle for running on rough terrain, the straddle type vehicle 1 may be a straddle type vehicle for circuit driving or street driving instead.

The present invention is not limited to the illustrated embodiments, and various improvements and design changes are possible without departing from the gist of the present invention.

What is claimed is:

1. A straddle type vehicle comprising:
    a body frame; and
    a rear fender attached to the body frame,
    wherein the rear fender has:
        a fitting portion fitted to a fitted portion of the body frame so as to be held by the body frame, and
        a fixing portion fixed to the body frame by a fixing member in a fitted state in which the fitting portion is fitted to the fitted portion;
    wherein one of the fitted portion and the fitting portion has a protrusion protruding in a vehicle longitudinal direction;
    wherein the other of the fitted portion and the fitting portion has a recess recessed in the vehicle longitudinal direction; and
    wherein the body frame and the rear fender are further configured such that, in the fitted state, the rear fender is restricted from moving vertically relative to the body frame by fitting the protrusion and the recess to each other, and substantially sandwiching the protrusion by the recess in the vertical direction.

2. The straddle type vehicle according to claim 1, wherein:
    the fitted portion has a protrusion protruding to the vehicle rear side, the protrusion having an inclined face inclined to one side in the vertical direction toward the vehicle rear side; and
    the fitting portion has a recess recessed toward the vehicle rear side, the recess having an inclined face inclined toward one side in the vertical direction toward the vehicle rear side and abutting on the inclined face of the protrusion.

3. The straddle type vehicle according to claim 1, wherein the body frame and the rear fender are further configured such that, in the fitted state, a contact area between a lower face portion of the protrusion and the recess is larger than a contact area between an upper face portion of the protrusion and the recess in the rear fender.

4. The straddle type vehicle according to claim 1, wherein:
    the body frame is one of a pair of body frames spaced apart in the vehicle width direction; and
    the fitting portion of the rear fender is one of a pair of fitting portions each fitted to a fitted portion of a respective one of the pair of body frames.

5. The straddle type vehicle according to claim 4, wherein the body frame and the rear fender are further configured such that, in the fitted state, the rear fender is restricted from moving in a vehicle width direction relative to the pair of body frames.

6. The straddle type vehicle according to claim 5, wherein the body frame and the rear fender are further configured such that, in the fitted state, the rear fender is substantially sandwiched by the pair of body frames in the vehicle width direction so as to be restricted from moving in the vehicle width direction relative to the pair of body frames.

7. The straddle type vehicle according to claim 1, wherein the fitting portion is provided on the vehicle rear side of the fixing portion.

8. The straddle type vehicle according to claim 1, wherein:
    the rear fender has a positioning portion positioned in the vehicle longitudinal direction relative to the body frame in the fitted state; and
    the fixing portion is configured to coincide with a fixed portion of the body frame in the vehicle longitudinal direction when the rear fender is positioned relative to the body frame by the positioning portion.

9. The straddle type vehicle according to claim 1, wherein the body frame extends linearly from the vehicle front side to the vehicle rear side.

10. The straddle type vehicle according to claim 1, wherein at least one of the fitted portion and the fitting portion is tapered from the vehicle front side toward the vehicle rear side.

11. The straddle type vehicle according to claim 1, further comprising:
   a seat on a vehicle front side of the rear fender; and
   a side cover on an outer side in a vehicle width direction of the rear fender and the body frame,
   wherein the body frame and the rear fender are further configured such that, in the fixing portion, the rear fender is fixed to the body frame, together with the seat and the side cover, by the fixing member.

12. A straddle type vehicle comprising:
   a body frame; and
   a rear fender attached to the body frame,
   wherein the rear fender has:
      a fitting portion fitted to a fitted portion of the body frame so as to be held by the body frame, and
      a fixing portion fixed to the body frame by a fixing member in a fitted state in which the fitting portion is fitted to the fitted portion;
   wherein at least one of the fitted portion and the fitting portion is tapered from the vehicle front side toward the vehicle rear side; and
   wherein each of the fitted portion and the fitting portion has:
      an upper face portion extending substantially horizontally in the vehicle longitudinal direction, and
      a lower face portion extending to the vehicle lower side from the vehicle rear side of the upper face portion and inclined to the vehicle front side toward the vehicle lower side.

13. A straddle type vehicle comprising:
   a body frame;
   a rear fender attached to the body frame; and
   a side cover disposed on an outer side in a vehicle width direction of the rear fender and the body frame,
   wherein the rear fender has:
      a fitting portion fitted to a fitted portion of the body frame so as to be held by the body frame,
      a fixing portion fixed to the body frame by a fixing member in a fitted state in which the fitting portion is fitted to the fitted portion, and
      an insertion recess recessed from the outer side in the vehicle width direction toward an inner side in the vehicle width direction, and into which the side cover is inserted to position the side cover relative to the rear fender.

\* \* \* \* \*